Oct. 12, 1965  J. BOLSEY ETAL  3,211,071
PHOTOELECTRIC DEVICES
Original Filed Aug. 22, 1957  3 Sheets-Sheet 1

INVENTORS
JACQUES BOLSEY
EMIL J. BOLSEY
BY
Albert Siegel
ATTY.

Oct. 12, 1965    J. BOLSEY ETAL    3,211,071
PHOTOELECTRIC DEVICES
Original Filed Aug. 22, 1957    3 Sheets-Sheet 2

INVENTORS.
JACQUES BOLSEY
EMIL J. BOLSEY
BY
Albert Siegel

Oct. 12, 1965   J. BOLSEY ETAL   3,211,071
PHOTOELECTRIC DEVICES

INVENTORS
JACQUES BOLSEY
EMIL J. BOLSEY

3,211,071
PHOTOELECTRIC DEVICES

Jacques Bolsey, deceased, late of New York, N.Y., by Norman W. Schur, executor, Davis Hill Road, Weston, Conn., and Emil J. Bolsey, 160 Concord Ave., White Plains, N.Y.
Continuation of application Ser. No. 679,710, Aug. 22, 1957. This application Mar. 19, 1963, Ser. No. 266,784
5 Claims. (Cl. 95—64)

This application is a continuation of application Serial No. 679,710, filed August 22, 1957, entitled "Photoelectric Devices," now abandoned.

The instant invention relates to photoelectric apparatus, and is especially useful in cameras, lightmeters, and like devices. In one embodiment it relates to an automatic diaphragm system for use in a camera, wherein is utilized a photoelectric cell, and wherein control and settings of such system are accomplished through mechanical spring tensioning means. When so used, an important aspect of our invention is that the operation of the diaphragm mechanism is controlled by a camera setting element, or elements, as for example, the film speed indicia. In that embodiment of our invention wherein it is adapted for incorporation within a lightmeter apparatus, settings thereof are likewise linked with such mechanical spring tensioning system and photoelectrically actuated meter movements are controlled by and integrated with various lightmeter setting elements, whereby direct readings for camera function settings are obtained.

If a controlled diaphragm or metering device is made merely with a galvanometer-photocell combination, without the addition of control elements such device may be considered as having little practical value. Since the possible light throughput of a camera, for example, may vary over such a wide range depending upon rapidly changing operating conditions, such device may either shut off the incoming light completely or have such physical imbalance that regularly reproducible results are impossible. To be commercially successful and to operate under practically all conditions of light, film speed, etc., control elements must be introduced into the photocell-galvanometer system, and it is to such control elements that the instant invention is primarily directed.

It is known in the prior art most closely relating to the instant invention that a photoelectrically activated or controlled galvanometer may be set at some empirical or actual zero point by the application of tension to a coil spring acting thereon. It is also known that diaphragm blades may be connected to the rotational elements of a galvanometer, either directly or through various intermediate means, whereby the size of a camera iris may be controlled by the amount of incident light, or that such light may be measured by incorporating a meter needle and related parts with said rotational elements. The prior art also shows that variable resistors and similar means have been utilized to integrate the sensitivity of diaphragm response with available light conditions. In devices produced in accordance with our invention such integration and control is performed through spring tensioning means operably engaged with, for example, various camera function setting elements, and variation in such spring tensioning is accomplished by the settings of such elements. Thus, for example, a setting for film speed or shutter speed in a still camera, or frames per second in a motion picture camera automatically sets the spring tension without further action by the operator being necessary, and accordingly integration is automatic and the operator need not concern himself with diaphragm or diaphragm sensitivity control.

Under that construction whereby the response sensitivity of a photocell-transducer unit is made adjustable by variable resistors connected in shunt, in series, or in some combination of both, between the current source and the transducer, it is found that the adjustment in sensitivity is variable with light input and thus different scales must be used for different sensitivity settings. On the other hand, some investigators have found that such sensitivity adjustment may also be obtained by the use of light-absorbing elements positioned between the light source and the photocell. In this latter case, likewise, different scales are necessary unless a form of light wedge be used as the interposed element.

As compared with the foregoing, our devices, particularly in one modification, consist of at least one photovoltaic cell actuating at least one electromechanical transducer, for example, a d'Arsonval type galvanometer, connected to a light vane or a camera diaphragm blade whereby the passage of light is accurately and simply controlled. Although the use of photoelectric cells to control lens diaphragm movements has been known for several years, as above indicated, the instant invention presents what we consider an improvement in this art. The crux of our invention lies in our means of varying the response sensitivity of the combination of photocell, or photocells, and transducer, or transducers, which means is primarily a spring tensioning mechanism, and further, providing a photocell, the output of which is substantially a logarithmic response to light input. We have thus improved upon the old photocell-galvanometer-diaphragm blade, or lightmeter needle combination by incorporating therewith such novel sensitivity adjustment means to produce devices having superior operating characteristics in addition to their greater ease of operation.

It is therefore preferable in our invention that the electrical impedance of the transducer be made sufficiently high to insure a substantially logarithmic response of the photocell. By way of example, for most present selenium photocells, a suitable characteristic for use herewith is obtained when:

$$\text{Area of cell} \times \text{Impedance} = 1,000 \text{ ohms} \times \text{in.}^2$$

This particular facet of our invention is further elaborated upon below. After providing for such response we then make the transducer, which may be exemplified by a d'Arsonval type galvanometer, zero setting adjustable over a wide range in the direction of negative values, introducing thereby an adjustable zero suppression. Such range of zero suppression in a d'Arsonval transducer, which is normally provided with two hairsprings, is increased by increasing the stiffness of the spring used to control the zero suppression.

In view of the foregoing, one object of the instant invention is to provide a photoelectrically actuated device, the response of which is controlled by a mechanical spring tensioning mechanism.

Another object of the instant invention is to provide a lens diaphragm which operates automatically in accordance with the amount of available light.

Still another object of the instant invention is to provide a photoelectric device for the control of the passage of light wherein the response sensitivity of such device to varying light conditions is adjustable by proper means.

A further object of the instant invention is to provide apparatus whereby such aforesaid proper means are mechanically linked with suitable functional elements of the mechanism with which the device is used.

Still another object of the instant invention is to provide a coordinated system for use in a camera whereby the settings, for example, for film speed and exposure time, are integrated with and automatically adjust diaphragm response sensitivity to various light conditions.

Another object of the instant invention is to provide a lens diaphragm mechanism which may either operate automatically or be manually controlled.

Yet another object of the instant invention is to provide a photoelectrically controlled automatic lens diaphragm wherein the sensitivity of the mechanism's response to various lighting conditions is determined by the tension applied to restoring springs operatively engaged with the driving mechanism of such diaphragm.

Still another object of the instant invention is to provide a lens diaphragm apparatus wherein the response sensitivity thereof is logarithmically related to its various operating parameters.

Still a further object of the instant invention is to provide such mechanism in a photoelectrically operable lightmeter whereby such meter's response to various light conditions is controlled by mechanical spring tensioning means linked to the lightmeter control elements, and whereby direct readings for camera settings are obtained.

Still another object of the instant invention is to provide a photoelectrically operable lightmeter capable of use over a wide range of operating conditions.

Other objects, features and advantages of the instant invention will become apparent to those skilled in this art from the following detailed disclosure thereof, and the drawings attached hereto and made a part hereof.

Figure 1:
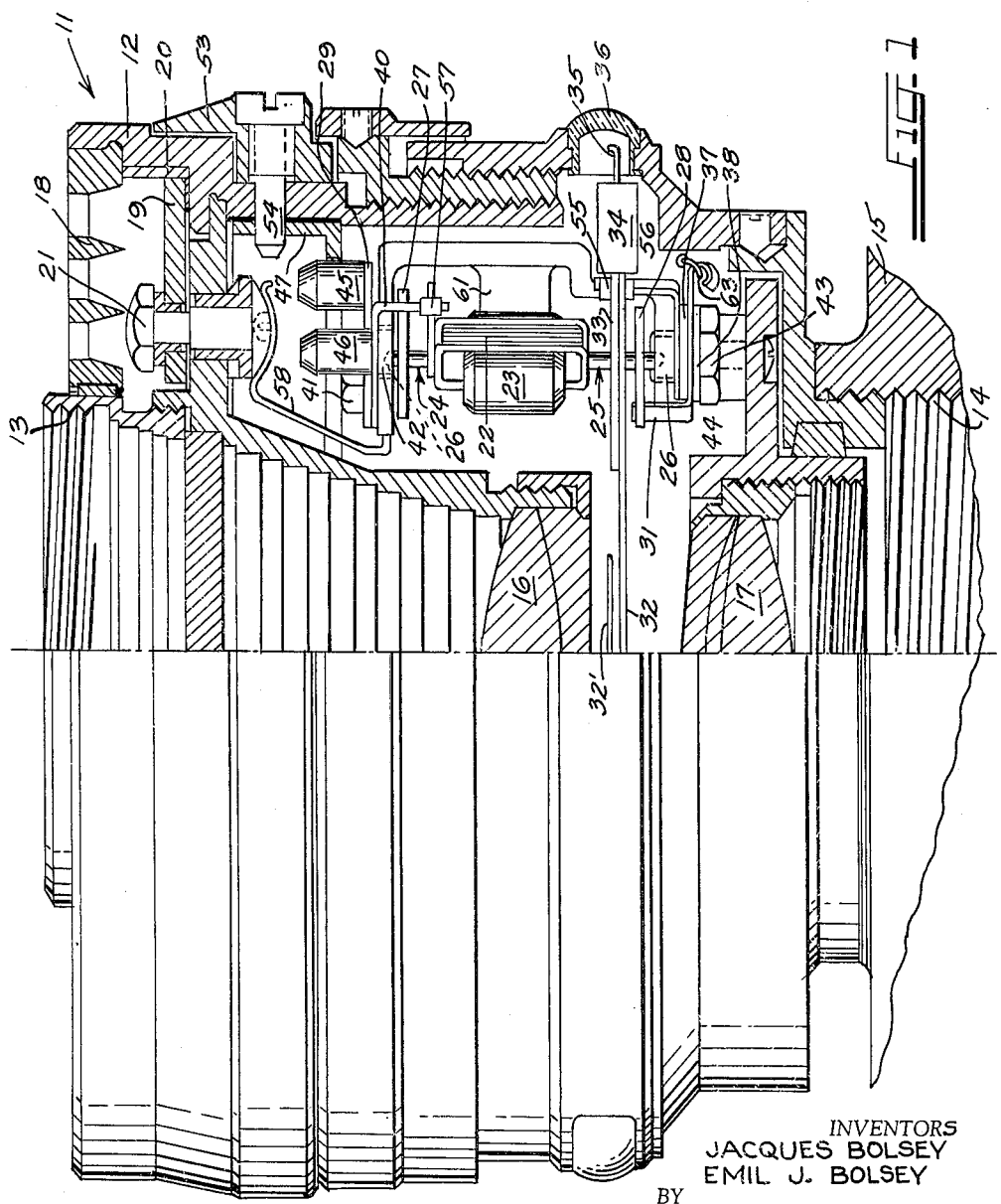
FIGURE 1 is a half sectional view of a lens unit produced in accordance with the instant invention.
Figure 2:
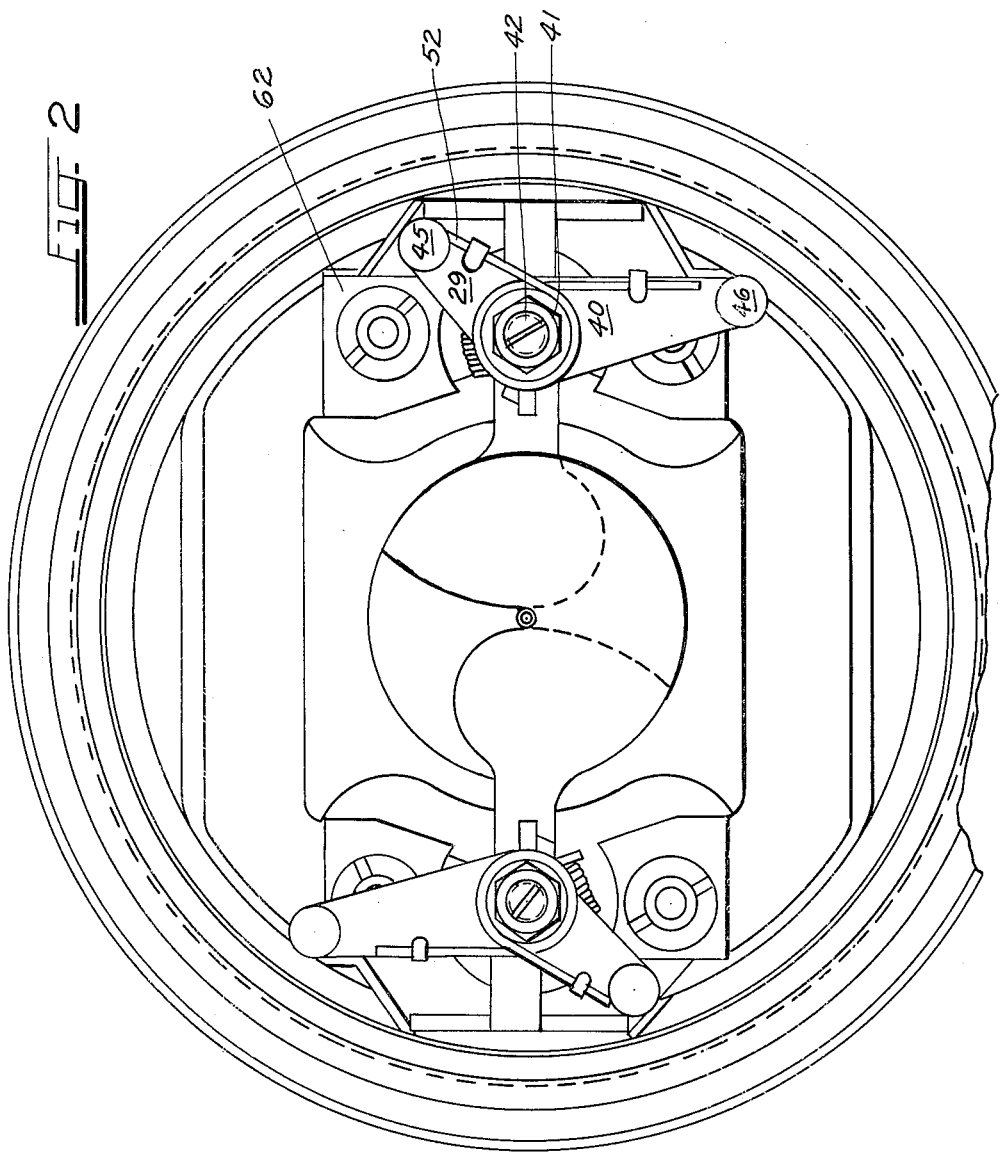
FIGURE 2 is a view of the diaphragm mechanism from the front.

In order that our invention may be best understood, our purposes should be further considered before entering upon a detailed description. When used with a camera we wish to provide a device having a photoelectrically driven diaphragm, the action of which is made to depend upon and is conditioned by various parameters selectable by a photographer as for example, shutter or film speeds. We accomplish this end by varying the tension of a restoring spring, or springs, acting upon a transducer in accordance with the settings for such parameters. In view of the essentially logarithmic response of the instant devices, several such parameters, acting as dividers or multipliers, may be readily introduced by adjusting the initial tension of the springs in proportion to the difference of their logarithms, and such initial tensioning permits the combination of several settings into one. Following this, as the parameter setting is made, the setting element acts upon a hairspring to modify the tension thereof; and the hairspring in turn determines the permitted reactivity of the diaphragm unit to light conditions. It is readily seen that such systems are easily incorporated into a variety of photographic apparatus such as a still camera lens mount, motion picture cameras, and other similar devices wherein light throughput must be controlled, and they may be further incorporated into various light measuring instruments.

The instant disclosure most completely presents a camera lens unit wherein the blades which form the iris diaphragm are photoelectrically controlled by the quantity of light reflected or emitted from the subject being photographed. For the sake of brevity, it is concerned primarily with the inclusion of our invention in a standard still camera, although it should be understood that other types of cameras, or lightmeters and similar devices may have such invention readily incorporated therein. The use of such still camera serves primarily to locate our invention in its proper environmental perspective. Furthermore, at the onset it should also be understood that although our disclosure deals with an automatic lens diaphragm control system having one annular photocell, two galvanometers and two diaphragm blades, multiples of these units are encompassed within the scope hereof.

Referring now to the drawings:

The lens mount, indicated generally by numeral 11, is formed of an external barrel 12, and a central barrel element 13, which are engaged at their inner and outer circumferences respectively as shown in FIGURE 1. To the rear of the barrel 11 is thread 14 which provides one means of attaching the lens mount to a camera body or another device with which it may be used, shown briefly by numeral 15. For purposes of description, such threaded portion will be hereinafter considered as the rear of such mount whereas the opposite end will be referred to as the forward or front portion. Positioned across the bore of the central body 13 are the front lens groupings 16, and the rear lens groupings 17, such groupings being of the usual type found in a still camera.

The operative elements of the instant invention exclusive of the external setting means, are found primarily in the space provided between the two barrel elements, 12 and 13. Here are located the photocell member, the spring tensioning mechanism, the galvanometer assembly, and the pivotal elements of the diaphragm blades. These operative elements will next be considered.

At the front of the lens mount, circumferentially positioned about the central body is a field limiting mask 18, the purpose of which is to match the field of view of the lens groupings 16 and 17 with that field actuating the photocell member. Such mask further serves, of course, to protect the photocell from physical injury. Recessed below such mask is an annular photocell 19, which is insulated from the mount by the interposition of insulating sleeve 20. A photocell bolt 21, not only securely unites the photocell to the lens mount frame, but additionally provides a portion of the electrical connection between the photocell and the galvanometer assembly.

The circular photocell represents the preferred type to use with the instant invention. Such configuration offers a larger cell area, but of greater importance, insures that the amount of light received by the cell remains substantially the same regardless of impinging light direction. It is quite conceivable that on certain cameras a lens or a filter may protrude beyond the photocell, and if merely a small non-annular cell were used would shadow all or part thereof. Furthermore, the circumferential location provides both lens and photocell with similar orientation and consequently they receive the same illumination.

The galvanometer assembly is quite similar to types which are commercially available. It consists of a moving coil 22, turnably positioned about a stationary galvanometer core 23, such moving coil being pivoted on the upper and lower galvanometer shafts, 24 and 25 respectively, which are in turn pivotable on bearings 26 located at their opposed ends. The coil and core are further supported by a core holding arm 61, while a permanent magnet 62 in part surrounds the coil.

Through its upper free end the moving coil 22 is connected to the inside end of the upper hairspring 27, whereas the lower free end of such coil is attached to the inside end of the lower hairspring 28. As shown in FIG. 1, both upper and lower hairsprings encircle about their related shafts 24 and 25.

The outside end of the upper hairspring 27 is connected to a short arm 29 which in turn is pivoted about bearing screw 42. Such upper hairspring provides simultaneous electrical and mechanical connections, as it not only forms part of the circuit from the moving coil to the body of the unit, but as is discussed in greater detail below, plays a most important role in tensioning such coil.

The lower hairspring 28 is connected to the opposite or lower end of the winding of the moving coil 22 at the inside end of such hairspring while the outside end thereof is attached to arm 31 rigidly fixed about the axis of the shaft 25. This spring is normally made substantially weaker than the upper in view of their different functions, and once calibrated by the manufacturer, is not appreciably altered in the operation of the device. As shown in the drawings, arm 31 is electrically insulated from the galvanometer assembly by suitable means, as for example, the washers 37 and 38.

A diaphragm blade 32 is supported by and operatively engaged with a cross arm 39 turnably mounted on the lower galvanometer shaft 25. Such cross arm also carries a counterweight 34 and a flag indicator 35, the latter being visible through a window magnifier 36. Two diaphragm blades 32 and 32′ operate in the space provided between the two lens groupings and cooperate to form the requisite diaphragm opening. The active edges of the blades are so shaped as to produce a suitable aperture with changes of light flux reaching the photocell 19. At this point it should be understood that the diaphragm blades may be positioned practically anywhere in the mount transverse to the incoming light rays and that the instant description is not a limitation upon this particular matter. It should be further understood that various types of linkages may be used to connect the diaphragm blade with the moving coil, as for example, it may be rigidly attached to the shaft 25 per se, but, the more direct is such linkage the more preferable will be the final product since less energy is then required to overcome inertia and frictional factors.

Upper arms 29 and 40 (the latter being also pivoted about bearing screw 42) are maintained in their proper operating position by a nut 41 on screw 42, whereas the lower arm 31 is positionally maintained by nut 43 on bolt 44.

Figure 3:
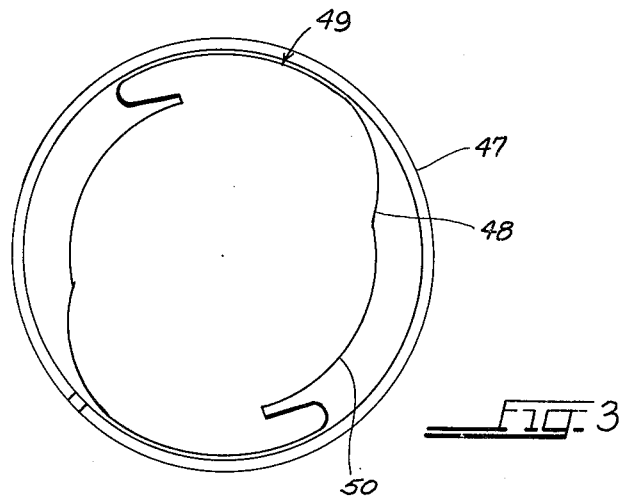
FIGURE 3 illustrates one modification of the spring tensioning ring.

Cam follower pins 45 and 46 are carried by arms 29 and 40 respectively and engage adjacent sections of the active profile of cam 47, such as sectors 48 and 49, or 48 and 50 (as indicated in FIGURE 3). The wire spring 52 is encircled about nut 41 and clipped to both arms whereby pins 45 and 46 are retained in contact with the cam. Such cam is rotatable upon the rotation of the external setting ring 53, as the two are coupled by a setting ring screw 54, which passes through a slot provided in barrel 12.

In order to illustrate our invention most clearly we have described a unit having only two galvanometer assemblies. The cam 47 presents a like surface to the tensioning pins of each of these assemblies, as is illustrated in FIGURE 3, and it should be further understood that such cam surface may be so constructed as to afford an active surface to a multiplicity of such assemblies.

A diaphragm blade stop 55, carried by an adjustable arm 56, limits the rotational motion of blade 32 about shaft 25, and controls the smallest limit of aperture size. At the forward end of the assembly, stop element 57 carried by arm 40 is capable of moving the coil 22 against hairspring tension for manual operation. Once such stop element engages said coil, it and its associated diaphragm blade are manually movable toward stop 55 to the position desired by the operator, and thus is manually determined desired aperture size.

The electrical connection between the photocell bolt 21, and the moving coil 22, is provided by a flat spring 58 connected by a wire with arm 29. The complete electrical circuit commences at an electrode on one side of the photocell, passes through the coil of one galvanometer, the lower hairspring, arm 31, wire 63, then across cam 47 and the body of the unit to the other galvanometer, from whence it completes the circuit by entering into a second electrode on the other side of the photocell. It will be evident to those familiar with such circuits that the galvanometers are thus connected in series.

Various setting rings are located circumferentially about the lens mount. As is well known, such rings normally are used to set the functional conditions of the camera; in the instant devices not only is this likewise done, but furthermore, such rings also determine diaphragm response sensitivity. In the drawings, the external ring 53 controls the tension of the upper galvanometer hairspring 27 and thus represents the operational control over the sensitivity of galvanometer response to various light intensities. For purposes of the instant illustration, ring 53 represents the combined film speed and shutter speed setting element. It is of course understood that other such elements could also be so used when found on a particular camera.

Figure 4:
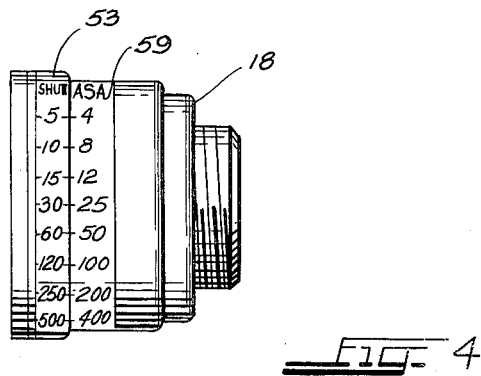
FIGURE 4 represents the exterior view of a lens unit incorporating our invention.

In FIGURE 4 is shown the external appearance of a lens mount produced in accordance with our invention. The usual setting rings are incorporated therearound, and, except for the photocell area, the mount appears to be almost identical with the usual device. We thus provide the photographer with no unnecessary operating complexities, yet still have the ease and simplicity of operation of an automatic diaphragm device.

Disregarding for the moment the various control elements involved herein, the instant invention presents an automatically operable camera diaphragm. As light rays impinge upon the photoelectric cell, current is generated thereby in amounts varying with light intensity, which current in turn actuates the galvanometers and causes movement in the turnable components thereof. The electric current imparts the usual galvanometer motion to the moving coil, the degree of motion being dependent upon the magnitude of such actuating current. The diaphragm blades are connected to the movable galvanometer elements, and movements thereof are in turn imparted to such galvanometer blades. Since each galvanometer coil turns in proportion to the current which energizes it, the related diaphragm blade also moves in proportion to such energizing current and thus the size of the diaphragm aperture is determined by the intensity of light actuating the photocell.

Turning next to the functioning and operation of the instant device in somewhat more detail, first assume that the device has already been calibrated by the manufacturer, that adequate lighting conditions exist for the photographic purposes at hand, and that automatic diaphragm action is desired. The photographer initially sets ring 53 for the appropriate film and shutter speeds. By this setting, the cam 47 is partially rotated and thus the surface presented to pins 45 and 46 is altered. For automatic operation ring 53 is turned so that pin 45 (on arm 29) rests against the sloping part, sector 48, of cam 47 while pin 46 (on arm 40) remains stationary against sector 49 on the active profile of such cam. As ring 53 is turned, which in turn rotates cam 47, there results a corresponding rotational movement of arm 29 about bearing screw 42. Since arm 29 is actively engaged with the upper hairspring coil 27, as such arm is rotated the tension of the coil is altered and thus the tension against which the moving coil 22 swings is caused to vary in proportion to the external ring setting. After such setting the lens unit is ready for operation. The subject matter is viewed and light therefrom and the vicinity thereof impinges upon and thus activities the photocell. The electrical current generated as a result of such activation in turn actuates the galvanometers and this imparts motion to coil 22, the degree of coil motion, or rotation being a function of input current therethrough, and of the setting of ring 53. Not only is coil motion controlled by such factors but, of great importance, to the instant invention the coil operates against the tension of coil springs 27 and 28, and thus the greater the tension of spring 27, the less will be the coil motion for equal current input.

As the coil is electrically turned, its motion is imparted to its attached diaphragm blade, and as the coil position is stabilized at a certain angle from its nonactive position so is the position of the diaphragm blade also stabilized. In this manner is obtained an iris of the required size for the available light conditions.

Provision is also made for the manual setting of the instant invention, that is, with the automatic features hereof locked out. For this purpose ring 53 and cam 47 are rotated until pin 46 (on arm 40) engages the sloping sector 48 on cam 47, whereas pin 45 is pressed against the constant radius sector 50 and does not appreciably move therefrom. Such manual operation mechanism may be used to maintain a fully opened iris, or to set in an aperture of the desired size, for once automatic operation is locked out the manual diaphragm setting mechanism becomes operable. It should be recalled that pins 45 and 46 are maintained against the various cam sectors by wire spring 52 encircling nut 41 and engaged with arms 29 and 40.

Another factor which must be considered, and one that is provided for in the instant invention, is the inclusion of a warning mechanism whereby the photographer is made aware of an excess of deficit of light under the particular film speed and shutter speed conditions. If, for example, there is too little light for a particular shutter speed, such warning indicates the necessity of reducing such speed. We may use many different types of warning devices, but for purposes of the instant example a simple mechanical apparatus is provided. A warning flag 35 is mounted at the end of cross arm 33 in such a manner that when the diaphragm blade 32 is at either of its positional limits as determined by stops 55 and 57 the flag is seen in the illumination indicator window 36. The position of the flag in such window will immediately convey to the operator the necessary information as to whether or not a resetting in required and, in the extreme case, whether or not a picture may be taken at all. Thus, the indicator acts as a built-in lightmeter in the lens mount.

As above indicated, stop means 55 and 57 restrain the diaphragm blade from either swinging too far open, or conversely, from closing too tightly.

As above mentioned, it is preferable that a photoelectric cell be used wherein current output is logarithmically related to actuational light. In order to clarify such condition, consider next a portion of the mathematics involved herein. Let:

$Ac$=photocell area
$E$=light input (lumens/cm$^2$)
$E_0$=arbitrary reference
$a$=sensitivity factor of photocell
$i$=photocell current
$\alpha$=galvanometer coil rotation from rest to full open position
$b$=aperture variation factor determined by the shape of the vane
$A$=minimum diaphragm aperture
$A_0$=maximum diaphragm aperture
$K$=sensitivity factor of galvanometers
$\alpha_0$="zero suppression" angle;

and, (1) $\qquad i \cong aAc \log E/E_0 - b\alpha$ (2) $\qquad A \cong Ac \times 10$

[(1) and (2) need only be approximated over the operating range of the device]

(3) $\qquad \alpha = K_1 - \alpha_0$ then, solving for A:

$$A = \frac{Ac}{10^b \alpha^0} \times \frac{E_0}{E^{bKaAc}}$$

But, for the correct operation of the device:

(4) $\qquad bKaAc = 1$ then:

(5) $$A = \frac{Ac}{10^b \alpha^0} \times \frac{E}{E_0}$$

This is preferable and $\alpha_0$ is a convenient parameter to adjust.

Next consider an example using the above derived equations; assume the following:

(1) Range of control desired $$\frac{Ac}{A} = 50$$

(2) $\alpha = 28.5 = \frac{1}{2}$ radian
(3) $K = 10^4$ radians/ampere then:

$10b/2 = 50$
$b/2 = \log 50$, and
$b = 3.4$

Therefore, for $$\frac{A_0}{A} = 50$$

cell sensitivity must be such that $(3.4 \times 10^4) \, aAc = 1$, or $aAc = 30 \times 10$ (amp at $10 \times E_0$). This may be obtained by the use of a suitable type of cell or by selecting the proper cell area, $Ac$.

That embodiment of the instant invention hereinabove described presents one of the simpler constructions thereof. Several equivalent modifications are also encompassed within its scope, as for example, other types of galvanometers may be used, a limitation being that the galvanometer movement-diaphragm linkage be as direct as possible in order that electrical energy need not be dissipated merely in the overcoming friction.

For some purposes it may be desirable to incorporate a source of electricity other than a photocell to drive the diaphragm blades, and utilize therewith a photoconductive rather than a photovoltaic cell whereby again, the current actuating the transducer element is controlled by such cell. Exemplifying this auxiliary source of electrical energy and control means therefore are a battery-transistor, or a battery-vacuum tube combination.

As above indicated the instant invention is readily utilizable with a lightmeter. The setting rings on the aforesaid lens mount are replaced by parameter setting elements on the lightmeter to provide the integrated spring tensioning mechanism.

It is of course understood, that modifications and variations may be effected without departing from the scope or the novel concepts of the instant invention.

We claim as our invention:

1. In a camera lens mount adapted to be affixed to a camera body and having setting rings thereon the combination of: an annular photoelectric cell positioned about the circumference of such lens mount to be impinged upon by light from the subject being photographed, said cell providing electrical current in essentially a logarithmic function of the excitation thereof; a photoelectric cell mask located on said lens mount and interposed between said cell and its activating light whereby stray light rays are blocked from said cell; a multiplicity of galvanometers electrically connected to said photoelectric cell and actuatable by current generated thereby, said galvanometers each having a moving coil element which is turnable in function with the photoelectrically generated current passing therethrough; a multiplicity of diaphragm blades operably connected to and positionable by said galvanometer coils, said blades being pivotable about the same axis as said galvanometer coils, and forming a diaphragm aperture; means for permitting said diaphragm blades to automatically form the requisite diaphragm aperture in accordance with both the amount of photographically available light and parameters determined by the camera function setting elements, said means consisting essentially of a spring tensioning mechanism operable in accordance with the positioning of a camera setting element ring and acting upon the galvanometer coils to control the turnability thereof in response to electrical current passing therethrough, such spring tensioning means being composed of an internally cam-surfaced ring operably engaged with a camera setting element whereby rotation of such element is imparted to such cam ring, a galvanometer-controlling hairspring, such hairspring being linked at one of its ends to a galvanometer moving coil, a first pivotal arm pressed against the cam surface and attached to the other end of said hairspring whereby rotation of such cam changes the position of such first arm about its pivot and thereby alters the tension of said hairspring; and means of locking out such automatic diaphragm mechanism to permit manual setting thereof, such means consisting essentially of a second pivotable arm pressing against said internal cam surface, such arm acting directly upon said galvanometer coil to control the size of the diaphragm aperture.

2. A camera lens mount comprising in combination: a photoelectric cell, the output of which is essentially a logarithmic function of excitation; at least one galvanometer actuatable by said photoelectric cell; at least one diaphragm blade linked to the moving member of each galvanometer and pivoted about the axis thereof whereby a diaphragm aperture of the requisite size is produced in relation to the photoelectric current; a warning mechanism mounted essentially at the outer end of a diaphragm blade and visible through a window provided in said lens mount by which the the photographer is made aware of the presence of proper picture taking conditions and camera settings; and spring tensioning means whereby is integrated proper diaphragm size, available light conditions, and operational camera parameters, such means being linked with a camera setting element and comprising a first galvanometer hairspring of variable torque acting upon the movable galvanometer element, a second galvanometer hairspring, the tension of which is less than that of the first hairspring by a predetermined amount, and means for varying the torque of the first hairspring, such latter means comprising a pivoted arm pressed against a turnable cam surface, the turning of which is controlled by the camera setting element; and means for manually controlling such diaphragm blades.

3. A photographic automatic exposure controlling device, comprising, in combination, a photo-electric current source, the output of which is essentially a logarithmic function of light input, rotatable galvanometer means powered by said current source, light controlling elements operably connected with said galvanometer means to reduce light transmission with increased illumination essentially as an exponential function of current, relatively stiff first spring means to provide a major portion of galvanometer restoring force, means to set the tension of said spring means for adjusting device response according to the desired exposure, and relatively weak second spring means providing a minor portion of galvanometer restoring force, said weak spring means being adjustable for initial calibration of the device.

4. In a photographic automatic exposure controlling device having a setting member thereon, the combination of a photo-electric current source, the output of which varies essentially logarithmically with light input; at least one galvanometer electrically connected to and actuable by said source, said galvanometer having a turnable element responding to said current; at least one diaphragm blade operably connected to and turnable by said galvanometer element to reduce light transmission when said input increases; spring means tending to turn said blade in opposition to said current, said setting member cooperating with a cam and a plurality of cam followers arranged for first adjusting the tension of said spring means according to the position of said member to adjust said device for the desired exposure as determined by shutter speed and film sensitivity, and for secondly manually adjusting the position of said diaphragm blade when automatic operation of the device is not required; and a visible indicating device operably engaged with said galvanometer to apprise the operator of prevailing conditions.

5. In a photographic automatic exposure controlling device as recited in claim 4, a setting member comprising a manually operable dial turnably mounted on an external surface of said device and rotatably engaging said cam, at least one cam follower being positioned by said cam and operably connected to said spring means for adjusting the tension thereof in response to the rotation of said dial over a first range and at least another cam follower lever being positioned by said cam and being arranged for positioning of said blade in response to the rotation of said dial over a second range.

References Cited by the Examiner

UNITED STATES PATENTS

| 2,051,061 | 8/36 | Tonnies | 95—64 |
| 2,573,729 | 11/51 | Rath | 95—64 |

FOREIGN PATENTS

| 827,027 | 1/38 | France. |

NORTON ANSHER, *Primary Examiner.*

EVON C. BLUNK, *Examiner.*